United States Patent
Weule et al.

(10) Patent No.: US 6,308,640 B1
(45) Date of Patent: Oct. 30, 2001

(54) TRANSPORTATION VEHICLE STEERING APPARATUS

(75) Inventors: Christian Weule, Baden (AT); Ralf Krause, Hanau; Holger Stubelt, Frankfurt, both of (DE); Jeffrey J. Schwalm, East McKeesport; William K. Cooper, Monroeville, both of PA (US)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/441,757

(22) Filed: Nov. 17, 1999

Related U.S. Application Data (60) Provisional application No. 60/123,960, filed on Mar. 12, 1999.

(51) Int. Cl.⁷ .................................................. B61C 11/00
(52) U.S. Cl. ...................... 105/72.2; 105/215.2; 104/243
(58) Field of Search .................................... 104/242, 243, 104/245, 247; 105/72.2, 215.1, 215.2; 180/401

(56) References Cited

U.S. PATENT DOCUMENTS

| | | | |
|---|---|---|---|
| 2,468,158 | * 4/1949 | Bartholomew | 104/242 |
| 3,077,165 | * 2/1963 | Vittorelli | 104/242 |
| 3,312,180 | 4/1967 | Mueller | 104/246 |
| 3,515,405 | 6/1970 | Segar | 280/113 |
| 3,796,165 | 3/1974 | Goode | 104/247 |
| 3,858,523 | 1/1975 | Allsup, Jr. | 104/247 |
| 3,921,466 | 11/1975 | Allsup, Jr. | 74/110 |
| 4,089,272 | 5/1978 | Schmitz | 104/247 |
| 4,223,611 | * 9/1980 | Dawson et al. | 104/247 |
| 4,232,611 | 11/1980 | Uozumi | 105/215 R |
| 4,299,172 | * 11/1981 | Dawson | 104/247 |
| 4,454,819 | * 6/1984 | Cuylitz et al. | 104/245 |
| 5,174,219 | * 12/1992 | Streiff | 104/247 |

* cited by examiner

Primary Examiner—Mark T. Le
(74) Attorney, Agent, or Firm—Webb Ziesenheim Logsdon Orkin & Hanson, P.C.

(57) ABSTRACT

A guidance apparatus is used on a transit vehicle which includes separate steerable drive tires operated by a central guidance platform having four peripherally mounted wheels follow the contour of a guide rail. The guide wheels are spaced above the roadway on a guideway used by the steerable drive tires thereby providing the capability of both on-track and off-track driving of the vehicle. A steering linkage imparts the linkage of a guide plateform to one steerable drive tire and a drag link transmits the rotary motion to the second steerable drive tire.

17 Claims, 5 Drawing Sheets

TRANSPORTATION VEHICLE STEERING APPARATUS

CROSS-REFERENCE TO RELATED APPLICATION

This application claims the benefit of U.S. Provisional Application No. 60/123,960, filed Mar. 12, 1999.

BACKGROUND OF THE INVENTION

1. Field of the Invention

This application is co-pending with an application entitled "Apparatus and Method for Steering a Guideway Vehicle" filed as a provisional application on Mar. 12, 1999 simultaneously with the subject provisional application and having the same inventorship.

This invention relates to steering mechanisms for vehicles. More particularly, it relates to an apparatus for steering a vehicle to follow a track or guideway.

2. Description of the Related Art

Various types of on-track and off-track vehicles are currently used for mass transportation. Frequently, it is desirable for the same vehicle to be available for use on a track following a guideway (on-track) as well as on a roadway without the assistance of a guideway (off-track). This is especially useful for a vehicle that must be removed from a guideway and moved to another location for repair or maintenance. The term "guideway" is used herein to describe a roadway surface with a guide rail for steering a vehicle along a predetermined course.

Typically, such a vehicle follows a guide rail embedded below the roadway surface of the guideway and, as a result, certain elements of the vehicle steering mechanism, such as the guide wheels extending from the vehicle undercarriage which track the guide rail, protrude below the roadway surface of the guideway. This arrangement is not acceptable for off-track use because the roadway would interfere with the steering mechanism.

Ordinarily, a vehicle adapted for use both on-track and off-track employs a conventional design using pneumatic tires to operate on any substantially flat surface. Accordingly, when operated as an on-track vehicle, the guideway is substantially flat and a guide rail is mounted on the guideway parallel to the roadway surface for guiding the vehicle along a predetermined course.

U.S. Pat. No. 3,796,165 describes a guide following steering apparatus in which all of the components of the steering apparatus are above the roadway surface of the guideway. The apparatus uses guide followers protruding from the front and the rear of the vehicle. Each guide follower is associated with two steerable drive tires on each of two axles and the two guide followers are connected together with steering linkages. However, the vehicle is bi-directional and only the leading guide follower, whichever one it may be, controls the steering for wheels on both axles. In certain instances, such a design is undesirable because the protruding guide followers diminish the ride quality of the vehicle.

U.S. Pat. No. 3,515,405 describes an axle suspension system for transit vehicles utilizing a central guidance system comprised of four guide wheels attached to a guide frame to follow the direction of a guide rail. In the process, one axle on the transit vehicle orients to follow that guide rail. At least two axles are associated with a separate guidance apparatus and there is no interconnection between the two apparatuses. However, the arrangement disclosed in this patent illustrates a guide rail below the roadway surface of the guideway which makes off-track use of the vehicle impossible. Furthermore, this arrangement pivots the entire axle such that the wheels on both sides of the axle rotate as a unit. This requires the entire axle, axle housing and associate frame to be rotated when it is only necessary to turn the wheels of the axle.

It is an object of this invention to provide a guidance apparatus capable of following a guide rail located on a guideway at or above the roadway surface of the guideway using a central guidance platform and steerable axles to alleviate the need to turn the entire axle and axle housing when the vehicle must turn.

SUMMARY OF THE INVENTION

The invention is directed to a steering apparatus for a vehicle adapted to travel on a guideway having a central guide rail parallel to the desired course of the vehicle. The vehicle has a vehicle body with front and rear wheel assemblies. At least one wheel assembly comprises a support frame attached to the vehicle body and a stationary axle housing mounted to the support frame. The axle housing contains an axle having an axle axis. A first steerable drive tire is mounted at one end of the axle and a second steerable drive tire is mounted at the other end of the axle. A guide frame is pivotally mounted to the axle housing about a vertical guide frame axis. Four guide wheels are pivotally mounted upon the guide frame to pivot the guide frame and turn the steerable drive tire.

The guide frame may be pivotally mounted to the axle housing through a ring bearing connecting the two frames.

The steering apparatus may include a steering linkage extending from the guide frame to the first steerable drive tire hub whereby when the guide frame rotates relative to the axle housing, the first steerable drive tire hub also rotates relative to the axle housing. A similar geometry may be utilized for the second steerable drive tire hub or, in the alternative, a drag link may connect the second steerable drive tire hub to the first steerable drive tire hub to impart steering to the second drive tire hub.

BRIEF DESCRIPTION OF THE DRAWINGS

The invention, along with the object and the advantages thereof, will be more apparent with the consideration of the following detailed description read in conjunction with the accompanying drawings in which.

DETAILED DESCRIPTION OF THE INVENTION

Figure 1:
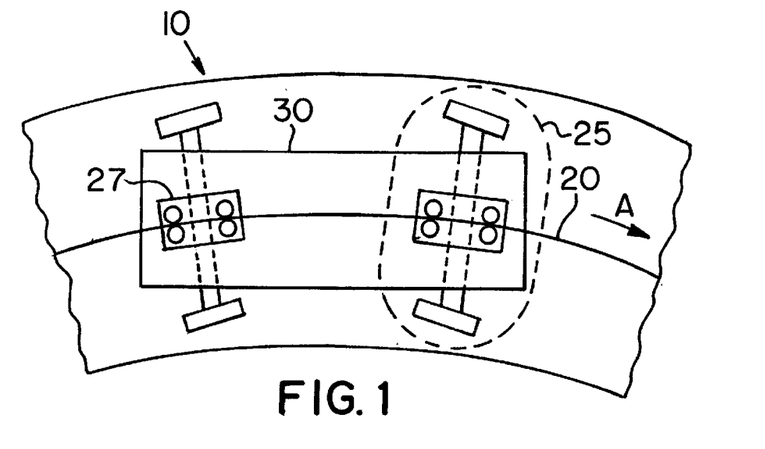
FIG. 1 is a schematic view of a guide rail and a transit vehicle utilizing the steering apparatus of the subject invention.

FIG. 1 illustrates a schematic of a bi-directional transit vehicle 10 which rides upon a guideway 15 in a direction indicated by arrow A, having a guide rail 20 used to direct a front wheel assembly 25 and a rear wheel assembly 27 to steer the transit vehicle 10. A vehicle body 30 rests upon the front wheel assembly 25 and the rear wheel assembly 27.

The vehicle 10 has the vehicle body 30 with the front wheel assembly 25 and the rear wheel assembly 27. While both wheel assemblies 25, 27 may be identical, attention will be directed to the front wheel assembly 25 for purposes of this discussion.

Figure 2:
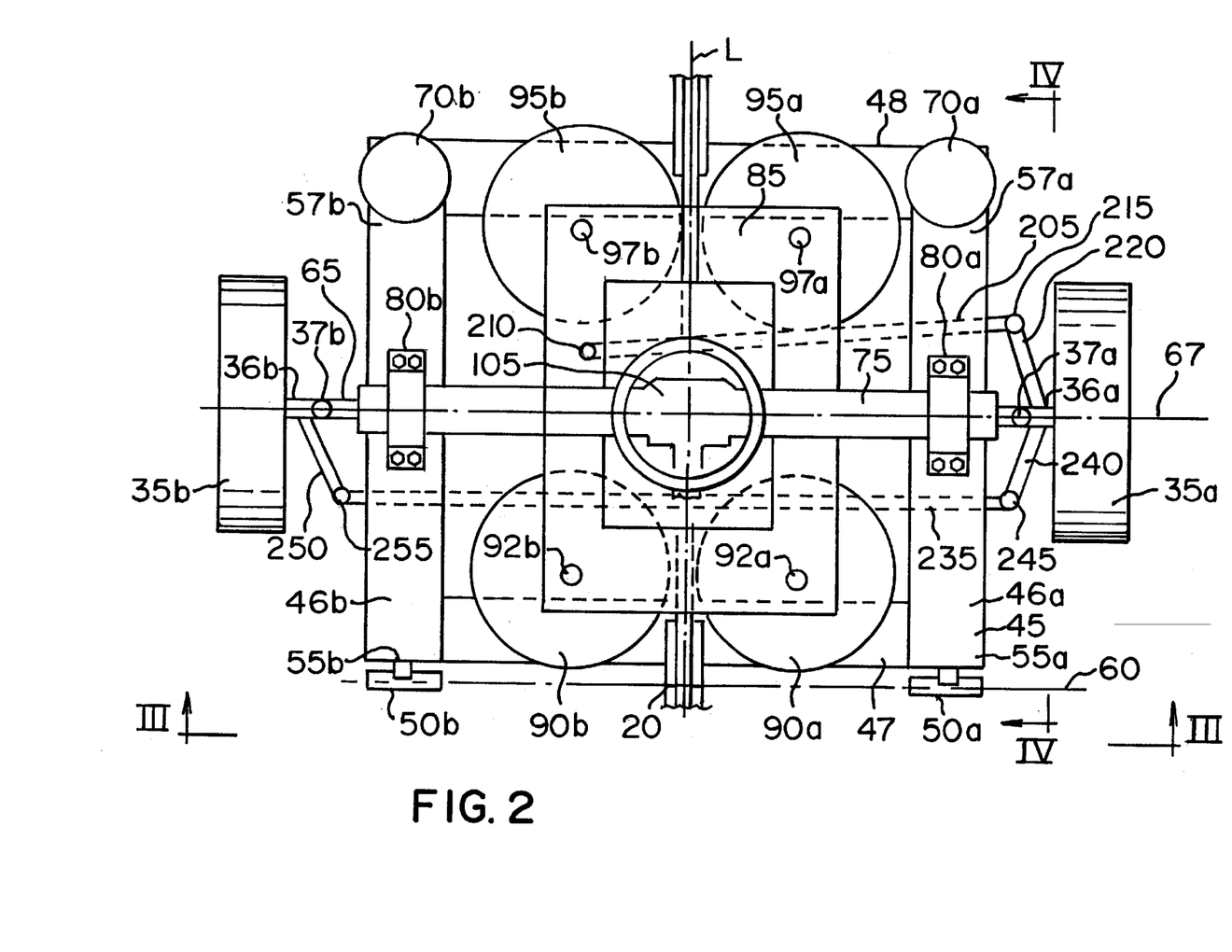
FIG. 2 is a schematic top view of the wheel assembly circled in FIG. 1.

FIG. 2 illustrates further details of the wheel assembly 25 circled in FIG. 1 and will be discussed in conjunction with FIG. 3. FIG. 3a represents one embodiment of the steerable drive tire axle details.

To enable the transit vehicle 10 to travel both on-track along the guideway 15 following the guide rail 20 and off-track, it is necessary for both wheel assemblies 25, 27 to be above the road surface 12 (FIG. 3) of the guideway 15. It is necessary to design the wheel assemblies so that their components are above the road surface 12 of the guideway 15. FIG. 3 illustrates the guideway 15, having a guide rail 20 mounted thereon with the front wheel assembly 25 having steerable drive tire hub 35a, 35b of the vehicle 10 which rest upon the roadway 12. The vehicle 10 will travel on the guideway 15 along the central guide rail 20 in a direction of the desired course of the vehicle 10.

For the most part, the design of the front wheel assembly 25 according to the subject invention is symmetric about line "L" running longitudinally through the center of the front wheel assembly 25. Therefore, identical reference numbers using an "a" or "b" suffix will be used to describe components on the right and left side respectively of the wheel assembly.

Returning to FIGS. 2 and 3, the front wheel assembly 25 is made up of a support frame 45 attached to the vehicle body 30. The support frame 45 may be attached to the vehicle body 30 using pivoting connections 50a, 50b at respective ends 55a, 55b of the support frame 45. The connections 50a, 50b pivot upon a common axis 60 which is parallel to a steerable drive tire axle 65.

The wheel assembly 25 may be attached to the vehicle body 30 using a wide variety of designs known by those individuals skilled in the art of transit vehicle design. One example of such a design is illustrated in FIGS. 2 and 3 where the support frame 45 is comprised of two structural members 46a, 46b connected by cross members 47, 48. As will be further explained, the structural members 46a, 46b are generally referred to as suspension arms. The subject invention is directed to the steering apparatus and not the suspension systems. Therefore, it should be appreciated that any number of different suspension systems connecting the wheel assembly 25 to the vehicle body are possible.

At opposite ends 57a, 57b of the support frame 45 are a pair 70a, 70b of spring damper systems which contact the underside of the vehicle body 30 to act as a suspension system for the front wheel assembly 25 and vehicle body 30.

It should be noted that the axle 65 is actually two axles driven by rotation from a drive shaft extending into a differential 105 within a differential housing 110. Furthermore, the attachment of each axle to a steerable drive tire 35a, 35b takes place at a universal joint to transmit rotation from each axle to the steerable drive tires 35a, 35b. The axles, which do not pivot with the steerable drive tires, will be referred to as a single steerable drive tire axle 65 having an axle axis 67. Steerable drive tires 35a, 35b are mounted at each end of the steerable drive tire axle 65. They are supported by drive tire hubs 36a, b which are connected to the axle housing 75 by pivot axes 37a, b.

Figure 4:
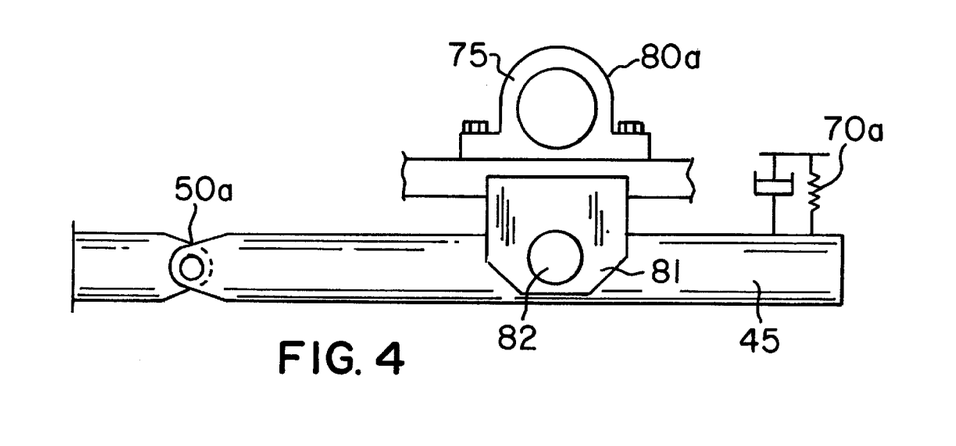
FIG. 4 is a schematic side view along arrows "4—4" in FIG. 2.

A stationary axle housing 75 houses the steerable drive tire axle 65. As illustrated in FIG. 4, which is a side view along arrows "4—4" in FIG. 2 without the guide frame structure and steering linkage, the axle housing 75 is secured to the support frame 45 using clamps 80a, 80b (only 80a shown) which are secured to a plate 81 which is pivotally secured with a post 82 to the support frame 45. As mentioned, the support frame is attached to the vehicle body 30 at one end by the pivoting connection 50a and is supported at the other end with the spring damper system. The support frame 45 in this arrangement is generally referred to as a suspension arm.

Returning to FIGS. 2 and 3, a guide frame 85 is pivotally mounted to the axle housing 75 about a vertical guide frame axis 87 which defines a pivot point. Four guide wheels 90a, 90b, and 95a, 95b are pivotally mounted upon the guide frame 85 about guide wheel axes 92a, 92b and 97a, 97b. As will be explained in further detail, the guide wheels 90a, 90b, 95a, 95b straddle the guide rail 20 and, as the guide wheels move along the rail, cause the guide frame 85 to pivot according to the contour of the guide rail. The guide wheel axes 92a, 92b and 97a, 97b are preferably oriented in the vertical direction.

As illustrated in FIG. 2, the guide wheels 90a, 90b and 95a, 95b are arranged in a rectilinear pattern within the guide frame 85 and are symmetric about the line "L". Furthermore, as illustrated in FIG. 2, the guide wheels 90a, 90b and 95a, 95b may be symmetric about the axle axis 67. However there may be situations in which asymmetry about the axle axis 67 is preferred to provide certain turning characteristics to the steering assembly and therefore the subject invention should not be limited to symmetric arrangements.

The pivotal mounting of the guide frame 85 to the axle housing 75 may be accomplished through the use of a ring bearing 100 (FIG. 3) having an inner race 102 attached to the axle housing 75 and an outer race 104 attached to the guide frame 85. The ring bearing 100 is used primarily to permit the guide frame 85 to rotate relative to the axle housing 75 but will tolerate lateral forces generated by the guide frame 85 rotations and will also tolerate vertical forces produced by the weight of the guide frame 85 and guide wheels 90a, 90b, 95a, 95b. Additionally, the bearing 100 will tolerate thrust forces. The guide rail 20 may have a narrow middle section 20. The guide wheels 90a, 90b, 95a, 95b, as illustrated in FIG. 3, contact the guide rail 20 and are deflected accordingly.

Connected to the steerable drive tire axle 65 is the differential 105 with a differential housing 110. As best illustrated in FIG. 3, the ring bearing 100 may surround the differential housing 110 and a ring bearing plane 115 defined about the periphery of the ring bearing 100 intersects with the differential housing 110. By nesting the differential housing 110 within a central opening 101 of the ring bearing 100, the front wheel assembly 25 and differential housing 110 are more efficiently arranged and vertical space needed beneath the vehicle body 30 is reduced. This feature is especially important for designs in which vertical space beneath the vehicle 10 is minimal as is the case when the guide wheels 90a, 90b, 95a, 95b may not extend below the level of the guideway 15.

The ring bearing 100 is mounted about a ring bearing vertical axis 117 located midway between the drive tires 35a, 35b on the steerable drive tire axle 65. In this way the guide frame 85 rotates at a point central between the steerable drive tires 35a, 35b to produce what is known as a central guidance platform.

In some steering mechanisms associated with vehicles using guide wheels, in order to follow a guide rail defining a path for a vehicle, the entire wheel assembly, including the axle housing and associated axles, rotates as a unit with the guide wheels in a fashion which maintains the axles perpendicular to the guide rail. In other words, the wheels do not independently pivot relative to the wheel axles. In the subject invention, however, the steerable drive tires 35a, 35b turn independently from the axle 65 and, as a result, it is not necessary to rotate the entire stationary axle housing 75 and support frame 45. By utilizing such a design, the inertial forces required to turn the vehicle 10 are significantly reduced and subsequently, the forces required on the guide wheels 90a, 90b, 95a, 95b to turn the steerable drive tires 35a, 35b are significantly reduced. This permits hardware associated with turning the drive tires to be smaller and lighter.

By utilizing the ring bearing 100 to pivotally attach the axle housing 75 and the guide frame 85 produces an additional advantage. The ring bearing 100 must support only the weight of the guide frame 85 and the guide wheels 90a, 90b and 95a, 95b. This is unlike prior art designs in which the entire axle rotates with the guide wheels to turn the vehicle wheels in unison. If a ring bearing were to be used with this prior art design, then the size of the ring bearing would have to be substantially greater because now the ring bearing would be supporting the weight of the vehicle body. For this reason, the present invention permits the use of the ring bearing 100 significantly smaller than a bearing that would be used in the entire stationary axle housing and where wheels are rotated in unison.

Figure 5:
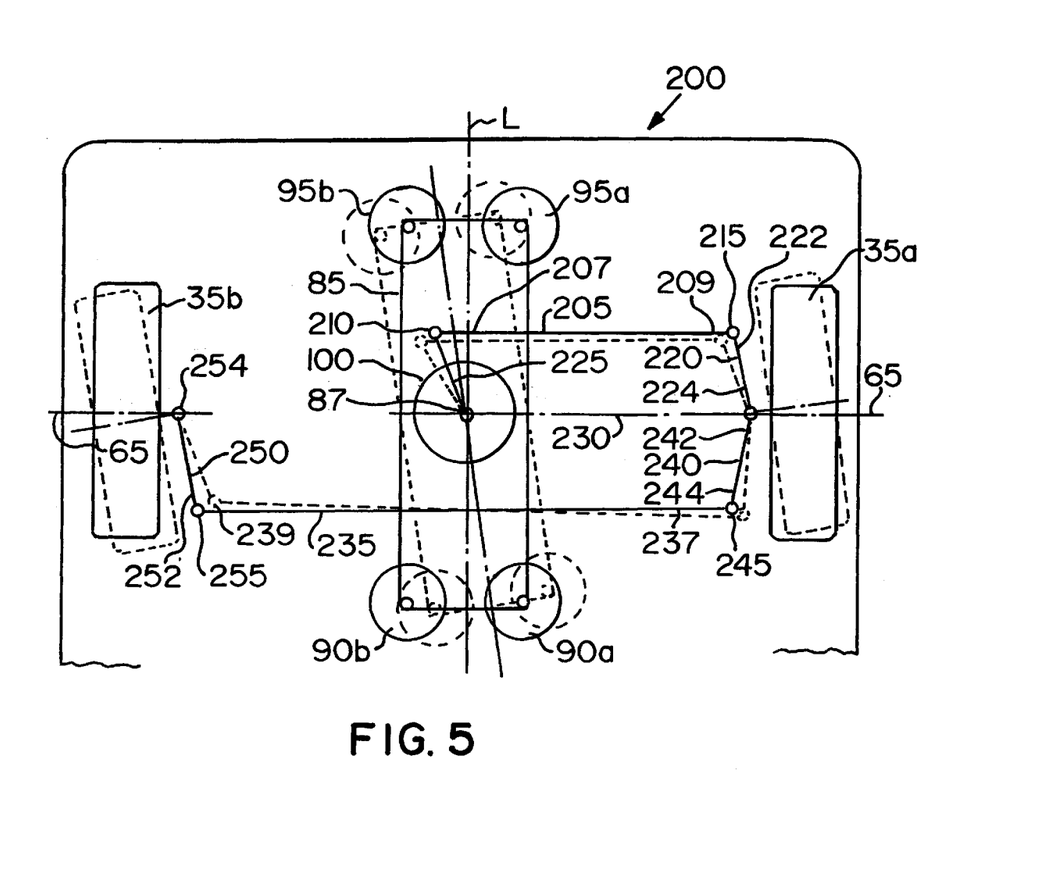
FIG. 5 is a schematic plan view of one steering linkage in accordance with the subject invention.
Figure 6:
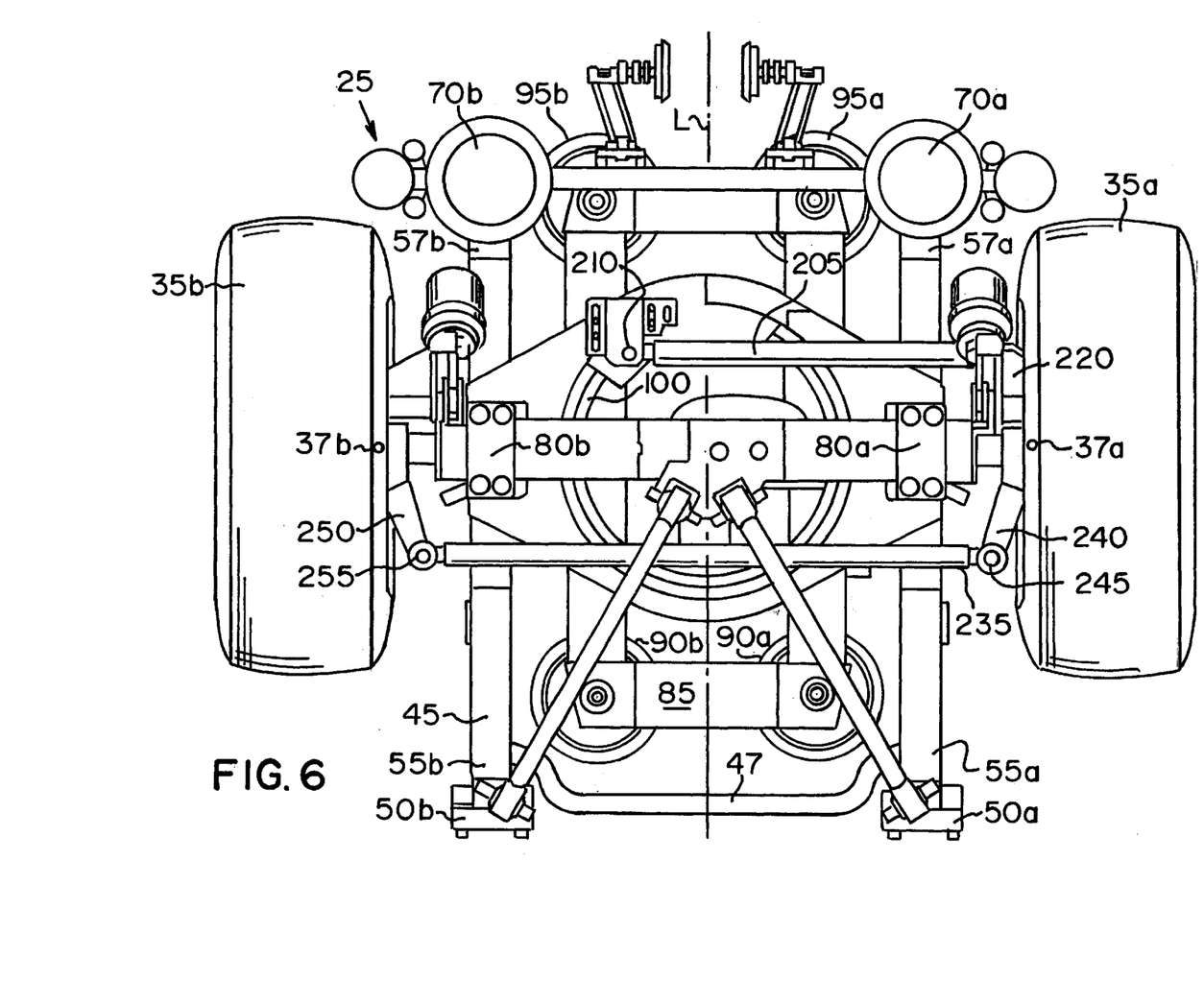
FIG. 6 is a detailed plan view of one embodiment of the subject invention.

To turn the steerable drive tires 35a, 35b, the wheel assembly 25 as illustrated by elements in dotted lines in FIG. 2, the schematic of the driving linkage in FIG. 5 and in the plan view of the embodiment of FIG. 6 includes a steering linkage 200 which extends from the guide frame 85 to the first steerable drive tire 35a such that when the guide frame 85 rotates relative to the axle housing 75, the first steerable drive tire 35a rotates relative to the axle housing 75.

The steering linkage 200 includes a steering tie rod 205 having a first end 207 and a second end 209. The first end 207 is pivotally connected through a pivot 210 to the guide frame 85 and is pivotally connected at a second end 209 through pivot 215 to the first steerable drive tire hub 36a. More specifically, steering tie rod 205 is pivotally connected to the first steerable drive tire 35 through a steering lever 220 having a first end 222 and a second end 224. The steering lever first end 222 is pivotally connected through pivot 215 to the steering tie rod second end 209 and is fixed at the second end 224 to the steerable drive tire hub 36a. The second end 224 is pivotally connected at pivot 37A to the axle housing 75. The second pivot 37a is approximately vertically.

A four bar trapezoidal steering geometry from the guide frame 85 to the first steerable drive tire hub 36a is thereby defined by a) guide frame virtual link 225 from the guide frame pivot point 87 to the first end 207 of the steering tie rod 205;
b) the steering tie rod 205 from the guide frame virtual link 225 to the steering lever 220;
c) the steering lever 220 from the steering tie rod 205 to the first steerable drive tire hub pivot 36a at 223; and
d) an axis virtual link 230 from the first steerable wheel hub pivot 36a to the guide frame pivot point 87.

By utilizing this four bar trapezoidal steering geometry, the rotation of the guide frame 85 is imparted to the steerable wheel hub 36a.

The first steerable drive tire hub 36a pivots about a hub pivot point 37a.

Although not illustrated in the figures, it is entirely possible to duplicate this four bar trapezoidal steering geometry with an independent set of linkages similar to those just described from the guide frame 85 to the second steerable drive tire hub 36b.

Nevertheless, illustrated in the drawings is a more conventional approach in which a drag link 235 having a first end 237 and a second end 239 extends from the first steerable drive tire hub 36a to the second steerable drive tire hub 36b to impart the rotation from the first steerable drive tire hub 36a to the second steerable drive tire hub 36b.

A first drag link lever 240 has a first end 242 fixed to the first steerable drive tire hub 36a and is pivotally connected about a pivot 245 to the first end 237 of the drag link 235. The other pivot axis coincidents with pivot 37b. A second drag link lever 250 has a first end 252 and a second 254 wherein the first end 252 is pivotally connected through pivot 255 to the second end 239 of drag link 235. The second end 254 of the second drag link lever 250 is fixed to the second steerable drive tire hub 36b. Through this arrangement of linkages, rotation of the guide frame 85 is imparted to the first steerable drive tire hub 36a and then imparted to the second steerable drive tire hub 36b. The trapezoid is closed by the axis housing between the pivots of both steering lever, respectively.

It should be noted that the goal of the steering linkage is to orient the steerable drive tires 35a, 35b through rotations of the drive tire hubs 36a, b around the drive tire hub pivot points 37a, b to duplicate an Ackermann steering system such that the radius of curvature of the wheel on the inside of a turn is smaller than the radius of curvature of a wheel on the outside of a turn.

It should be noted that the second end 224 of steering lever 220 is fixed not only to the first steerable drive tire hub 36a but is also fixed to the first end 242 of the first drag link lever 240.

In addition to illustrating a schematic of a steering mechanism, FIG. 5 also indicates in phantom the manner in which the guide frame 85 rotates and the effect such a rotation has on the steering linkage and the drive tires 35a, 35b. Each of the elements previously identified and shown in solid lines is also shown in dotted lines in its displaced position. Because this phantom motion is clear, duplicate reference numbers are not added to highlight the same part in its phantom position. The angles and lengths associated with each element of the steering linkage 200 will be obvious to one skilled in the art of steering mechanisms and for that reason, these details have not been provided.

The detailed plan view of FIG. 6 of one embodiment of the subject invention illustrates the actual hardware for one embodiment of the subject invention and should be used in conjunction with the previously provided schematics to appreciate the orientation of and actual appearance of the elements of the subject invention. Like reference numerals have been added to FIG. 6 to make such an identification convenient.

Figure 3:
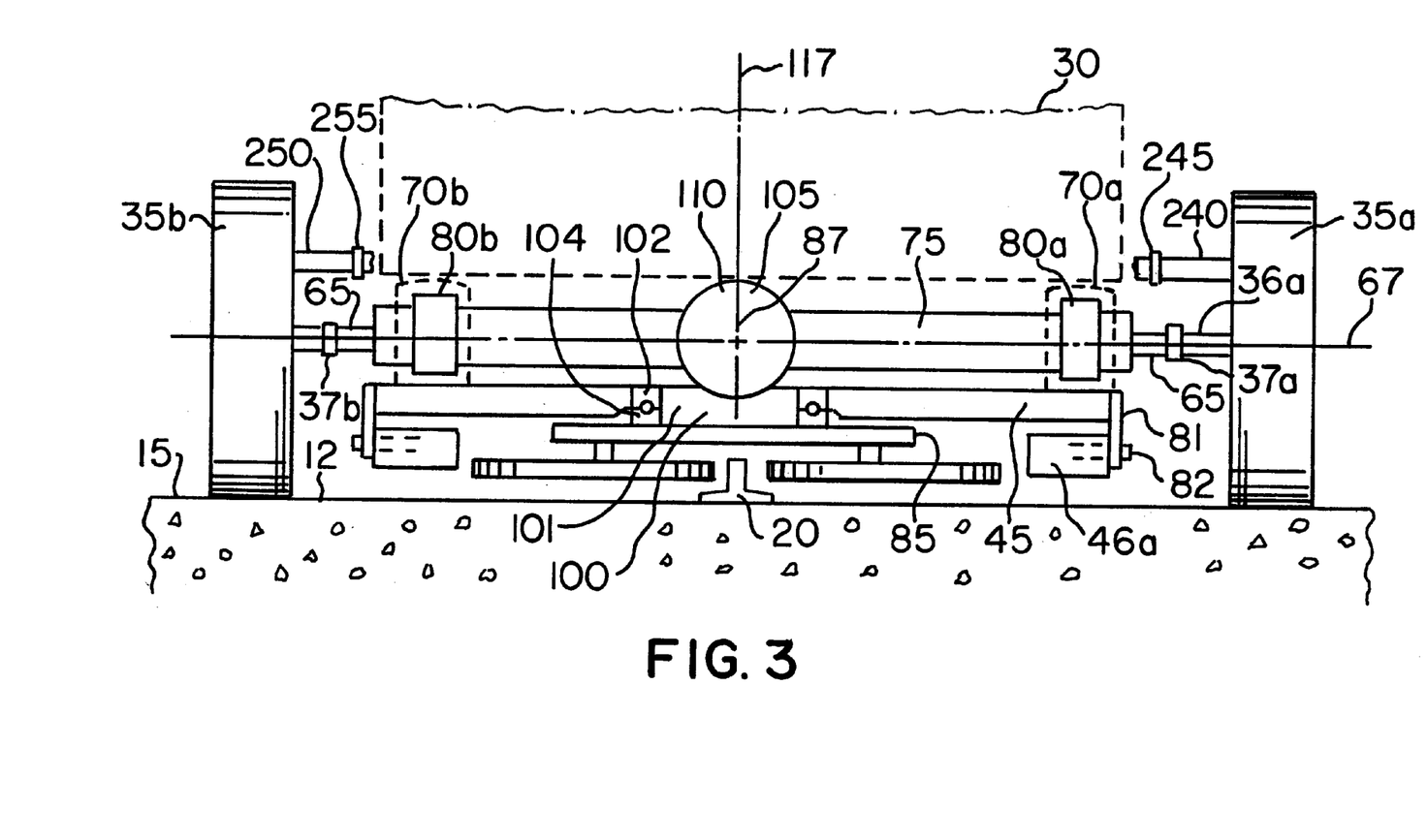
FIG. 3 is an end view of the wheel assembly along arrows "3—3" in FIG. 2.
Figure 3A:
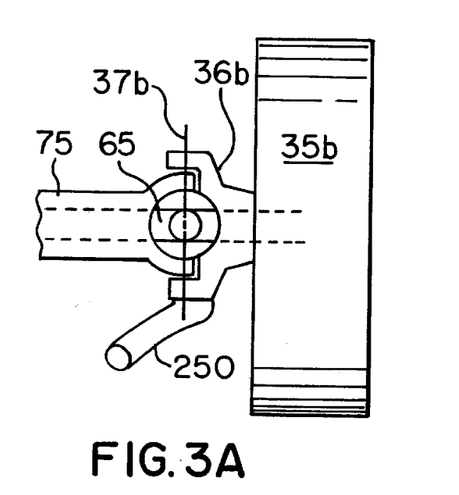
FIG. 3a is a detached view of the axle details of a steerable drive tire.

Note however, the guide wheels 90a, 90b, 95a, 95b are spaced from longitudinal axis L a greater amount than in FIG. 3. The width of the actual guide rail used in the FIG. 6 arrangement is wider to engage the guide wheels.

Although this invention has been described with respect to preferred embodiments, various modifications, revisions and additions will become evident to persons of ordinary skill in the art. All such modifications, revisions and additions are intended to be encompassed in the scope of this invention which is limited only by the claims appended hereto.

What is claimed:

1. A steering apparatus for a vehicle adapted to travel on a guideway having a central guide rail parallel to a desired course of the vehicle, wherein the vehicle has a vehicle body with front and rear wheel assemblies, said steering apparatus having at least one of the front wheel assembly and the rear wheel assembly and comprising:
   a) a support frame adapted to be attached to the vehicle body;
   b) a stationary axle housing mounted to the support frame, wherein the axle housing contains an axle having an axle axis;
   c) a first steerable drive tire mounted at one end of the axle and a second steerable drive tire mounted at the other end of the axle;
   d) a guide frame pivotally mounted to the axle housing about a vertical guide frame axis to define a guide frame pivot point;
   e) four guide wheels pivotally mounted upon the guide frame about guide wheel axes to follow the guide rail; and
   f) wherein the guide frame is pivotally mounted to the axle housing through a ring bearing, wherein the ring bearing has a first race secured to the guide frame and a second race associated with the first race and secured to the axle housing and wherein the first race and second race are concentric circular rings defining a bore extending therethrough into which vehicle components may extend.

2. The steering apparatus according to claim 1 wherein the support frame is pivotally attached to the vehicle body about an axis parallel to the axle axis.

3. The steering apparatus according to claim 1 wherein the guide wheel axes are oriented in the vertical direction.

4. The steering apparatus according to claim 3 wherein the guide wheels are arranged in a rectilinear pattern within the guide frame.

5. The steering apparatus according to claim 1 wherein the guide wheels are symmetric about the guide rail.

6. The steering apparatus according to claim 1 wherein the guide wheels are symmetric about the axle axis.

7. The steering apparatus according to claim 1 further including a differential with a differential housing positioned on the axle housing and wherein the ring bearing surrounds the differential and a plane defining a periphery of the ring bearing intersects the differential housing.

8. The steering apparatus according to claim 1 wherein the ring bearing is mounted about a vertical axis located midway between the wheels on an axle.

9. A steering apparatus for a vehicle adapted to travel on a guideway having a central guide rail parallel to a desired course of the vehicle, wherein the vehicle has a vehicle body with front and rear wheel assemblies, said steering apparatus having at least one of the front wheel assembly and the rear wheel assembly and comprising:
   a) a support frame adapted to be attached to the vehicle body;
   b) a stationary axle housing mounted to the support frame, wherein the axle housing contains an axle having an axle axis;
   c) a first steerable drive tire mounted at one end of the axle and a second steerable drive tire mounted at the other end of the axle;
   d) a guide frame pivotally mounted to the axle housing about a vertical guide frame axis to define a guide frame pivot point;
   e) four guide wheels pivotally mounted upon the guide frame about guide wheel axes to follow the guide rail; and
   f) a steering linkage extending from the guide frame to a first steerable drive tire hub of the first steerable drive tire and, through a first drag link connecting the first and second steerable drive hubs, to a second steerable drive tire hub of the second steerable drive tire, whereby when the guide frame rotates relative to the support frame the first steerable drive tire and the second steerable drive tire also rotate.

10. The steering apparatus according to claim 9 wherein the steering linkage includes a steering tie rod pivotally attached to the guide frame at a first end and pivotally attached to the first steerable drive tire hub at the second end.

11. The steering apparatus according to claim 10 wherein the steering tie rod is pivotally connected to the first steerable drive tire hub through a steering lever which itself is pivotally connected to the steering tie rod at one end and fixed to the steerable drive tire hub at the other end.

12. The steering apparatus according to claim 11 wherein a four bar trapezoidal steering geometry from the guide frame to the first steerable drive tire hub is defined by:
   a) a guide frame virtual link from the guide frame pivot point to the first end of the steering tie rod;
   b) the steering tie rod from the guide frame virtual link to steering lever;
   c) the steering lever from the steering tie rod to the wheel hub pivot point to the axle housing; and
   d) an axle axis virtual link from first steerable drive tire hub to guide frame pivot point.

13. The steering apparatus according to claim 12 further including a duplicate four bar trapezoidal steering geometry from the guide frame to the second steerable drive tire hub.

14. The steering apparatus according to claim 13 further including a first drag link lever fixed to the first steerable drive tire hub at one end and pivotally connected to the first drag link at the other end and a second drag link lever pivotally connected at the other drag link end and fixed to the second steerable drive tire hub.

15. The steering apparatus according to claim 10 wherein the guide frame is pivotally mounted to the axle housing through a ring bearing.

16. A steering apparatus for a vehicle adapted to travel on a guideway having a central guide rail parallel to a desired course of the vehicle, wherein the vehicle has a vehicle body with front and rear wheel assemblies, said steering apparatus having at least one of the front wheel assembly and the rear wheel assembly and comprising:
   a) a support frame adapted to be attached to the vehicle body;
   b) a stationary axle housing mounted to the support frame, wherein the axle housing contains an axle having an axle axis;
   c) a first steerable drive tire mounted at one end of the axle and a second steerable drive tire mounted at the other end of the axle;
   d) a guide frame pivotally mounted to the axle housing about a vertical guide frame axis to define a guide frame pivot point;
   e) four guide wheels pivotally mounted upon the guide frame about guide wheel axes to follow the guide rail; and
   f) a differential with a differential housing positioned on the axle housing and wherein the ring bearing surrounds the differential and a plane defining a periphery of the ring bearing intersects the differential housing.

17. A steering apparatus for a vehicle adapted to travel on a guideway having a central guide rail parallel to a desired course of the vehicle, wherein the vehicle has a vehicle body with front and rear wheel assemblies, said steering apparatus having at least one of the front wheel assembly and the rear wheel assembly and comprising:

a) a support frame pivotally attached to the vehicle body about an axis parallel to the axle axis;

b) a stationary axle housing mounted to the support frame, wherein the axle housing contains an axle having an axle axis;

c) a first steerable drive tire mounted at one end of the axle and a second steerable drive tire mounted at the other end of the axle;

d) a guide frame pivotally mounted to the axle housing about a vertical guide frame axis to define a guide frame pivot point;

e) four guide wheels pivotally mounted upon the guide frame about guide wheel axes to follow the guide rail.

* * * * *

UNITED STATES PATENT AND TRADEMARK OFFICE
CERTIFICATE OF CORRECTION

PATENT NO.    : 6,308,640 B1
DATED         : October 30, 2001
INVENTOR(S)   : Christian Weule et al.

It is certified that error appears in the above-identified patent and that said Letters Patent is hereby corrected as shown below:

<u>Title page,</u>
Item [75], Inventors "Holger Stubelt" should read -- Holger Strubelt --.

Signed and Sealed this

Twenty-third Day of July, 2002

Attest:

Attesting Officer

JAMES E. ROGAN
*Director of the United States Patent and Trademark Office*